US012771162B2

(12) United States Patent
Albrecht et al.

(10) Patent No.: US 12,771,162 B2
(45) Date of Patent: Oct. 20, 2026

(54) METHOD FOR CONTROLLING THE CHARGING PROCESS OF AN ELECTRICAL ENERGY STORAGE DEVICE, AND CHARGING DEVICE, AS WELL AS SYSTEM CONSISTING OF ELECTRIFIED VEHICLE AND CHARGING DEVICE

(71) Applicant: Volkswagen Aktiengesellschaft, Wolfsburg (DE)

(72) Inventors: Jan-Christoph Albrecht, Wolfsburg (DE); Jochen Westhaeuser, Braunschweig (DE); Frank Juergen Engler, Wolfsburg (DE); Carsten Wachsmuth, Schwuelper (DE); Arne-Christian Voigt, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 320 days.

(21) Appl. No.: 17/181,767

(22) Filed: Feb. 22, 2021

(65) Prior Publication Data

US 2021/0265853 A1 Aug. 26, 2021

(30) Foreign Application Priority Data

Feb. 21, 2020 (DE) ..................... 10 2020 202 293.3
Apr. 14, 2020 (DE) ..................... 10 2020 204 697.2

(51) Int. Cl.
*H02J 7/00* (2026.01)
*B60L 53/60* (2019.01)
(Continued)

(52) U.S. Cl.
CPC .............. *H02J 7/977* (2026.01); *B60L 53/60* (2019.02); *B60L 58/26* (2019.02); *H02J 7/80* (2026.01)

(58) Field of Classification Search
CPC ......... B60L 2240/545; B60L 2240/662; B60L 53/60; B60L 58/26; B60L 2240/10; H02J 7/0047; H02J 7/007194
See application file for complete search history.

(56) References Cited

U.S. PATENT DOCUMENTS 8,174,235 B2 5/2012 Dyer et al.
8,587,253 B2 11/2013 Dyer et al.
(Continued)

FOREIGN PATENT DOCUMENTS

CN 104044479 A 9/2014
DE 102012213855 A1 2/2014
(Continued)

*Primary Examiner* — Julian D Huffman
*Assistant Examiner* — Sadia Kousar
(74) *Attorney, Agent, or Firm* — Muncy, Geissler, Olds & Lowe, P.C.

(57) ABSTRACT

A method for controlling the charging process of an electrical energy storage device, at an electric charging device, wherein the charging device has a temperature control system and the energy storage device has a temperature control system, including at least the following steps: transfer of electrical energy between the charging device and the energy storage device, transfer of thermal energy between a temperature control system of the charging device and the temperature control system of the energy storage device, obtaining charging progress information, and closed-loop or open-loop control of at least a first temperature of a cooling medium in the temperature control system of the charging device and/or of the energy storage device as a function of the charging progress information.

14 Claims, 2 Drawing Sheets

(51) Int. Cl.

| | |
|---|---|
| ***B60L 58/26*** | (2019.01) |
| ***H02J 7/80*** | (2026.01) |
| ***H02J 7/90*** | (2026.01) |

(56) References Cited

U.S. PATENT DOCUMENTS

| | | | | |
|---|---|---|---|---|
| 9,114,794 | B2 | 8/2015 | King et al. | |
| 2003/0102845 | A1* | 6/2003 | Aker | H02J 7/0047 320/140 |
| 2009/0243538 | A1* | 10/2009 | Kelty | H01M 10/615 320/104 |
| 2012/0043935 | A1* | 2/2012 | Dyer | B60L 58/12 320/109 |
| 2013/0166119 | A1* | 6/2013 | Kummer | H01M 10/625 701/22 |
| 2013/0241490 | A1* | 9/2013 | Kim | H02J 7/007194 320/112 |
| 2014/0277869 | A1* | 9/2014 | King | B60W 10/26 701/22 |
| 2017/0088005 | A1* | 3/2017 | Christen | B60L 53/14 |
| 2019/0118655 | A1* | 4/2019 | Grimes | B60L 53/68 |
| 2019/0168593 | A1* | 6/2019 | Nakaso | B60L 58/24 |
| 2019/0241093 | A1* | 8/2019 | Shimauchi | H01M 10/6563 |

FOREIGN PATENT DOCUMENTS

| | | | | |
|---|---|---|---|---|
| DE | 112012003109 | T5 | 7/2014 | |
| DE | 102013021360 | A1 * | 6/2015 | B60H 1/00914 |
| DE | 102015013296 | A1 | 5/2016 | |

* cited by examiner

METHOD FOR CONTROLLING THE CHARGING PROCESS OF AN ELECTRICAL ENERGY STORAGE DEVICE, AND CHARGING DEVICE, AS WELL AS SYSTEM CONSISTING OF ELECTRIFIED VEHICLE AND CHARGING DEVICE

This nonprovisional application claims priority under 35 U.S.C. § 119(a) to German Patent Application No. 10 2020 202 293.3, which was filed in Germany on Feb. 21, 2020 and to German Patent Application No 10 2020 204 697.2, which was filed in Germany on Apr. 14, 2020, which are both herein incorporated by reference.

BACKGROUND OF THE INVENTION

Field of the Invention

The present invention relates to a method for controlling the charging process of an electrical energy storage device, a charging device, as well as a system having an electrified vehicle and a charging device.

Description of the Background Art

Electrified vehicles have a battery to provide electrical energy for driving the vehicle. In most cases, this battery can be electrically charged through an external interface. Especially with fast charging processes, greater heating of the battery occurs in this process than when driving. This results in higher cooling requirements during the charging process than during travel. In the prior art, provision is made to meet these higher cooling requirements by the means that additional cooling capacity is provided by the charging device during the charging process.

In this context, the document DE 10 2012 213 855 A1 discloses a charging station and a battery arranged in a vehicle, wherein the vehicle can be connected to the charging station with a charging cable and a temperature control line.

Furthermore, the document DE 11 2012 003 109 T5, which corresponds to US 2012/0043943, discloses a method for charging an electric vehicle having an electric battery. The charging in this case includes the supply of a coolant to the electric vehicle in order to cool the electric battery during the charging process, especially for charging power levels between 100 and 300 kW. Fast charging stations in this context are positioned at strategically favorable locations along public roadways.

SUMMARY OF THE INVENTION

It is therefore an object of the present invention to at least partially improve the known state of the art.

The method according to an exemplary embodiment of the invention provides a method for controlling the charging process of an electrical energy storage device, at an electric charging device, wherein the charging device has a temperature control system and the energy storage device has a temperature control system. The method comprises at least the following steps: transfer of electrical energy between the charging device and the energy storage device, transfer of thermal energy between a temperature control system of the charging device and the temperature control system of the energy storage device.

The method also includes the steps of obtaining charging progress information, and closed-loop or open-loop control of at least a first temperature of a cooling medium in the temperature control system of the charging device and/or of the energy storage device as a function of the charging progress information.

A charging process can be understood here to mean that electrical energy is transferred between the charging device and the energy storage device. This includes the charging of the energy storage device by the charging device using electrical energy, for example from the power distribution network and/or a generator unit. However, it also includes the discharging of the energy storage device through the charging device, for example into the power distribution network and/or another energy storage device.

The electric charging device can be a battery charging point that can transfer electrical energy to an electrical energy storage device, in particular by means of a charging cable and a charging plug. This is compatible with most electrified vehicles at present. However, it can also be a charging station that can transfer energy by means of an induction plate to an induction plate electrically connected to an energy storage device. This has the advantage that the charging process can be carried out in a contactless manner, in particular without the necessity of plugging in a plug.

The charging device can obtain the electrical energy for charging the electrical energy storage device from the power distribution network. This results in great availability of electrical energy. In other embodiments, the charging device obtains the electrical energy for charging the electrical energy storage device from another electrical energy storage device, for example an electrical energy storage device arranged in the charging device. In some embodiments, provision is additionally made that the charging device obtains the electrical energy from a generator unit, which is to say, for example, from a fuel cell and/or an electric generator driven by an internal combustion engine. The latter embodiments have the advantage that they can be set up anywhere, independently of an electric power supply infrastructure.

The transfer of electrical energy between the charging device and the energy storage device is accomplished in the present case by means of an appropriate interface. This interface of the charging device for the transfer of electrical energy can be connected to an interface of an electrical energy storage device for the transfer of electrical energy. It is not strictly necessary for the connection to be direct in this case. An indirect connection is also possible. For example, the connectable interface can be the interface of an electrified vehicle that is electrically connected to the energy storage device to be charged. The only relevant factor is that the connectable interface is suitable for the transfer of electrical energy between the charging device and the electrical energy storage device. The transfer here can take place both conductively, which is to say, for example, by means of a cable and/or a busbar, and inductively. Preferably, a plug-in conductive connection is used as the interface, which is to say, for example, a socket into which it is possible to plug a cable with a connector, which in turn has an electrical connection to an energy storage device to be charged and/or can be brought into electrical connection with an energy storage device to be charged. Of course, a cable can also be permanently connected to the charging device. This cable then has, on the end not connected to the charging device, a plug that can be brought into electrical connection with an energy storage device to be charged. If the energy storage device of an electrified vehicle is involved, then the vehicle usually has a socket that is electrically connected to the energy storage device.

The transfer of thermal energy between the charging device and the energy storage device is likewise accomplished by means of an appropriate interface. This interface of the charging device for the transfer of thermal energy can likewise be connected to an interface of the energy storage device to be charged for the transfer of thermal energy. Here, too, it is not strictly necessary for the connection to be direct. The interface need only permit the transfer of thermal energy between the charging device and the energy storage device. In some embodiments the transfer of thermal energy is accomplished by means of a thermally conductive solid. Preferably, however, the transfer of thermal energy is accomplished by means of a fluid, especially preferably by means of a liquid, for example by means of a water-based coolant. In some embodiments, a fluid is used that is also used for temperature control of the energy storage device outside of the charging process. If this device is, for example, the traction battery of an electrified vehicle, which provides a temperature control system with a particular coolant for temperature control of the battery, then the same coolant can be used for transferring thermal energy between the charging device and the battery. This advantageously reduces the number of components needed for the transfer of thermal energy. Preferably, the transfer of thermal energy is also carried out by means of a heat exchanger. In this case a temperature-control medium, which is to say, for example, a cooling fluid, in particular liquid coolant, whose temperature is directly controlled by the charging device, and a temperature-control medium that directly controls the temperature of the electrical energy storage device are physically separated by a heat exchanger. As a result, the temperature-control media of the charging device and of the energy storage device can be selected independently of one another.

An electrical energy storage device can be understood in the present case to mean any device that is suitable for storing electrical energy. This can be, for example, a capacitor, and/or preferably a battery, especially preferably a lithium-ion battery. Furthermore, it preferably is a traction battery, which is to say a battery that provides the electrical energy for driving an electrified vehicle. It is especially preferred for this to be a battery with a rated voltage of at least 100, 200, or 400 volts. Such batteries have the advantage that they store electrical energy especially efficiently. The electrified vehicle in this case is a pure electric vehicle, in particular. It can also be a hybrid or a hydrogen-powered vehicle, however. Moreover, it preferably is a land vehicle, especially preferably a trackless land vehicle.

The charging device additionally can have a temperature control system. It contains the components necessary for thermal management of the charging device. It serves the purpose of heat and/or fluid transfer, in particular under open- and/or closed-loop control, between a thermal interface of the charging device and other components. The other components are preferably heat exchangers to the outside air and/or to additional coolant and/or refrigerant circuits. The heat transfer in the temperature control system by preference is accomplished by means of a temperature-control medium, either in a temperature-control medium circuit or in multiple temperature-control medium circuits that interact by means of heat exchangers and/or valves.

The energy storage device likewise can have a temperature control system. It likewise contains the components necessary for its thermal management. It serves the purpose of heat and/or fluid transfer, in particular under open- and/or closed-loop control, between a thermal interface to a charging device and other components. The additional components are preferably heat exchangers to the outside air and/or to additional coolant and/or refrigerant circuits. In particular, the additional components are additional components necessary for the thermal management of a vehicle, such as a refrigerant circuit, which in some embodiments is used simultaneously for temperature control of the passenger compartment. The heat transfer in the temperature control system by preference is accomplished by means of a temperature-control medium, preferably by means of a coolant, either in a temperature-control medium circuit or in multiple temperature-control medium circuits that interact by means of heat exchangers.

An open-loop and/or closed-loop control of the temperature control system of the charging device and/or of the temperature control system of the energy storage device preferably occurs here taking into account the efficiencies of the additional components of the temperature control system of the charging device and/or of the temperature control system of the energy storage device. For this purpose, an open-loop and/or closed-loop control system can additionally and/or exclusively influence, in particular perform open-loop and/or closed-loop control of, the charging power transferred through an interface for electrical energy transmission.

The heat exchangers to the outside air associated with the temperature control system of the charging device and/or the condensers of a refrigerant circuit associated with the charging device can be arranged above the charging device, in particular vertically and/or in a V-shape. This represents an especially space-saving embodiment.

If an additional heat exchanger is used for the heat transfer between the charging device and the energy storage device and if the temperature control system of the charging device and/or of the energy storage device additionally has a refrigerant circuit, then in some embodiments the refrigerant circuit is also integrated into the additional heat exchanger, so that an integrated heat exchanger with two coolant circuits and at least one refrigerant circuit is produced.

The components can be arranged at least partially underground. In this embodiment, the cooling medium can be routed directly through the ground, which has a beneficial effect on efficiency. In some of these embodiments, a heat pump is also used in combination with the heat exchanger in the ground.

The charging progress information can include, for example: how long a current charging process has already lasted and/or how long a current charging process will continue to last. “How long a current charging process will continue to last” in this context can be understood primarily to mean the time interval after which and/or the time in the future at which a current charging process is completed or is expected to be completed.

For example, the charging progress information can be expressed as a time indication. However, it can also be specified as a relationship to a completed charging process, which is to say, for example, as a percentage. In some embodiments, the information specifies discrete charging phases, which is to say, for example, start of charging and end of charging.

The charging progress information can furthermore be determined directly by a computing unit associated with the charging device. In particular, state variables of the energy storage device, such as state of charge and/or temperature and/or maximum permissible charging power, are evaluated for this purpose. In some embodiments, external state variables such as outside air temperature and/or available cooling capacity of the charging device are also evaluated.

Furthermore, a user input, for instance a charge start time and/or charge end time that is input by a vehicle user, is preferred.

Closed- and/or open-loop control of at least a first temperature of a cooling medium means, in particular, that an absolute level or a relative increase in a temperature of a particular cooling medium at a particular point in the temperature control system of the charging device and/or of the energy storage device is controlled in a closed-loop and/or open-loop manner as a function of the charging progress information. A first temperature can also be understood here as a characteristic temperature for the temperature control system and/or the charging device. Nor does the designation as first temperature necessarily presuppose, moreover, that an additional temperature is present and/or taken into account. The function is preferably implemented as a characteristic map with at least the charging progress information as an input variable and an absolute level or a relative increase in a temperature of a first cooling medium as an output variable.

The first temperature can be furthermore controlled in a closed-loop or open-loop manner as a function of information on the outside air temperature. Taking the outside air temperature into account improves the effectiveness of the system, since both the efficiency of the temperature control systems and the risk of icing in the cooling water depend thereon.

The closed-loop or open-loop control of the first temperature can be deactivated when the outside air temperature exceeds a specified temperature threshold. As a result, an especially simple implementation of the method is produced.

The first temperature can be the supply temperature of the temperature control system of the charging device. The supply temperature directly corresponds to the temperature of the coolant when it is delivered to the temperature control system of the energy storage device. It therefore permits an especially direct influencing of the battery temperature control.

The first temperature can be lowered. Lower temperatures allow higher charging power levels, and thus shorter charging processes, on account of the greater cooling effect.

The first temperature can be increased at the start of a charging process and/or can be increased at the end of a charging process and/or can be lowered between them.

The first temperature can be increased by at least 5 K at a time in this case.

The method can also additionally have the following steps: obtaining a temperature specification that was generated by a computing unit associated with the electrical energy storage device, and closed-loop or open-loop control of the first temperature furthermore dependent on the temperature specification. A temperature specification by a computing unit associated with the electrical energy storage device has the advantage that it makes possible control that is matched especially well to the technical characteristics of the energy storage device. For example, the temperature specification can be a maximum technically permissible and/or minimum technically permissible and/or desired supply temperature of the charging device.

The invention relates furthermore to a charging device for electrical energy storage devices, having: at least a first interface for the transfer of electrical energy, at least a second interface for the transfer of thermal energy, a temperature control system, and a computing unit, designed to carry out the method according to one of the preceding claims.

The computing unit can be, for example, a control unit arranged on or in the charging device. Preferably, however, it is a virtual, cloud-based computing unit that is in contact with the charging device through a radio or cable link.

In addition, the invention relates to a system formed of an electrified vehicle and a charging device, wherein the vehicle has: at least one energy storage device, at least a first interface for the transfer of electrical energy, which can be connected to the first interface of the charging device, at least a second interface for the transfer of thermal energy, which can be connected to the second interface of the charging device, wherein the second interface of the vehicle is in operative thermal connection with a temperature control system of the energy storage device and the energy storage device can be electrically charged by means of the first interface.

"Operative thermal connection" can be understood to mean generally the presence of equipment and/or means that make possible an exchange of thermal energy between the temperature control system and the thermal interface. This means, in particular, that a temperature change of, for example, at least 1 K over a period of one hour at the thermal interface brings about a temperature change of, for example, at least 1 K over a period of one hour in the temperature control system, and vice versa. "Operative fluidic connection" can be understood to mean generally the presence of equipment and/or means that make possible an exchange of fluid between the temperature control system and the thermal interface.

Further scope of applicability of the present invention will become apparent from the detailed description given hereinafter. However, it should be understood that the detailed description and specific examples, while indicating preferred embodiments of the invention, are given by way of illustration only, since various changes, combinations and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
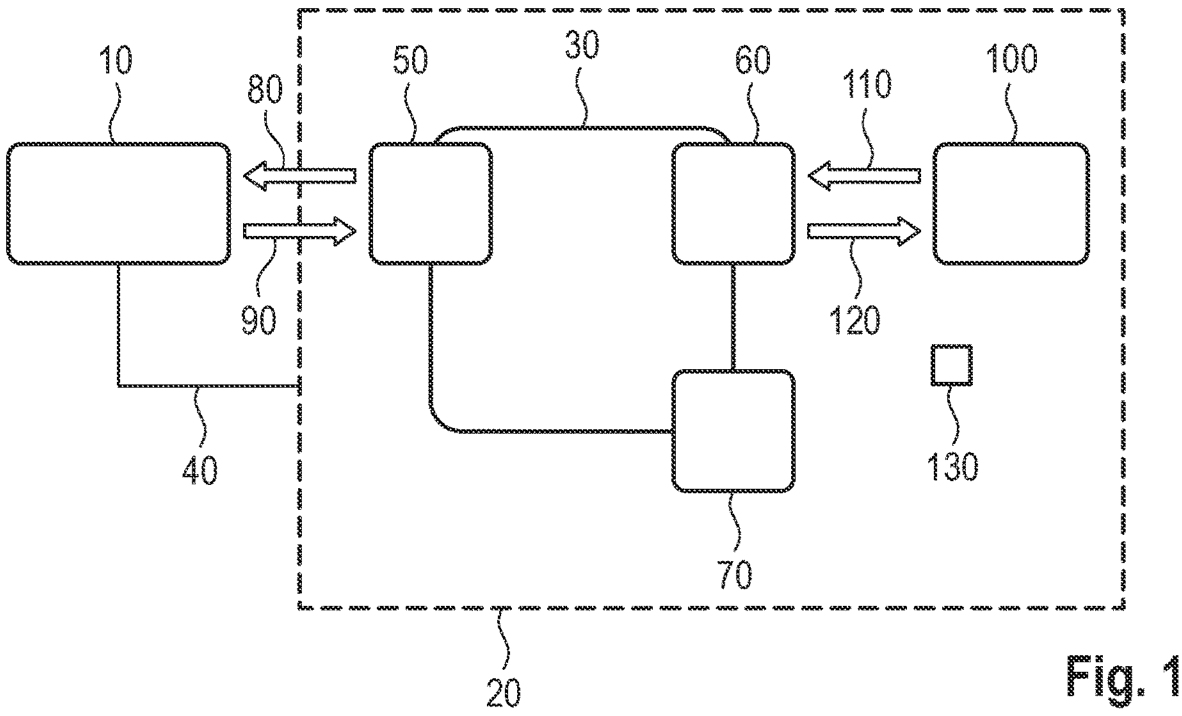
FIG. 1 shows an exemplary design of a charging device according to the invention.

FIG. 1 shows an exemplary design of a charging device 20 according to the invention. The charging device 20 is connected to a vehicle 10 through an electrical interface 40 and also through a thermal interface consisting of coolant supply 80 and coolant return 90. In this design, thermal energy is transferred between the temperature control system of the battery charging point 20 and the temperature control system of the vehicle 10 by means of a coolant/coolant heat exchanger 50. Consequently, no exchange of coolant occurs between the temperature control systems. The coolant in use coming from the thermal interface 80, 90 corresponds here to the coolant used in the temperature control system of the vehicle 10.

The charging device 20 in this exemplary embodiment additionally includes a thermal reservoir 30. It is integrated in the temperature control system of the battery charging point 10. It can be cooled or heated prior to a charging process. Subsequently, the heating or cooling capacity thus stored can be used additionally during the charging process for temperature control of the energy storage device.

The temperature control system of the battery charging point 10 in this case includes a coolant/coolant heat exchanger 50, a coolant/refrigerant heat exchanger 60, and a coolant/air heat exchanger 70, as well as the additional hoses, pipes, control elements, and connecting elements required to connect them to one another, to the vehicle 10, and to the thermal reservoir 30. It is designed such that an exchange of thermal energy between all heat exchangers 50, 60, 70 is possible and can be adjusted in a targeted manner. The coolant/refrigerant heat exchanger 60 is designed for the transfer of thermal energy with a refrigeration system 100, and can be used for temperature control of the thermal reservoir 30.

The charging device 20 additionally has a computing unit 130, which is designed to carry out the method according to the invention and to control the temperature control system. The sensors and actuators required for control are not shown here.

Figure 2:
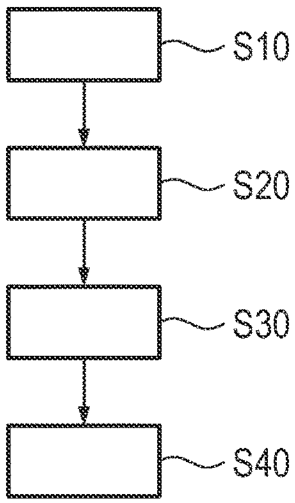
FIG. 2 shows an exemplary sequence of the method according to the invention.

FIG. 2 shows an exemplary sequence of the method according to the invention. In a first step S10, the transfer of electrical energy between a charging device and an energy storage device, which in this case is designed as a traction battery of an electrified vehicle, is begun. As a rule, this step takes place directly after an electrical interface of the charging device is connected to an electrical interface of the energy storage device. Preferably this is the case when a user inserts the charging plug of a charging cable connected to the charging device into the charging socket of his electrified vehicle. In a second method step S20, the transfer of thermal energy between a charging device and the energy storage device is begun as a result. This represents the preferred order of the method steps. In some implementations of the method, however, these method steps also take place simultaneously or in the reverse order. Furthermore, the sequence relates only to the start of the transfer processes. Of course, it is possible that electrical energy and thermal energy are transferred between the charging device and the energy storage device simultaneously. In another step S30, the charging device obtains charging progress information, which in this case contains both the information as to how much time has passed since the start of the charging process, which is to say since execution of step S10, as well as how much time still remains until the estimated end of charging. These pieces of information are preferably available as a time indication, for example in seconds. If no user input is available as to when the charging process ends—for example, because the user leaves the charging device with the vehicle—, then the remaining charging time is determined from the energy required until complete charging of the energy storage device along with the smaller of the nominal charging power of the charging device or of the energy storage device. The time since the start of the charging process is determined by the battery charging point itself.

In another step S40, the supply temperature of the charging device is controlled as a function of the charging progress information in such a manner that it is 35° C. at the start of the charging process. As a result, the temperature of the energy storage device is initially increased, thus decreasing its internal resistance and reducing the effects of high charging currents on the aging of the energy storage device. Moreover, as a result the probability of icing in the temperature-control medium lines is reduced in the case of low outside air temperatures as well as in the case of leaks outside of the temperature-control medium lines. Once the energy storage device temperature and the temperature-control medium temperatures in the temperature control system of the energy storage device have exceeded a certain threshold, for example 30° C., the cooling phase begins. In this phase, the supply temperature is adjusted to a low value, just above the freezing threshold of water, of 5° C., so that, for example, water condensed on the temperature control lines does not freeze. As a result, the waste heat produced during the charging process is dissipated especially efficiently. A short time, for example 5 minutes, before the end of the charging process, the supply temperature is again raised to the level of 35° C. As a result, the energy storage device warms up, which reduces its internal resistance, and thus the energy losses, for subsequent driving of the vehicle.

Figure 3:
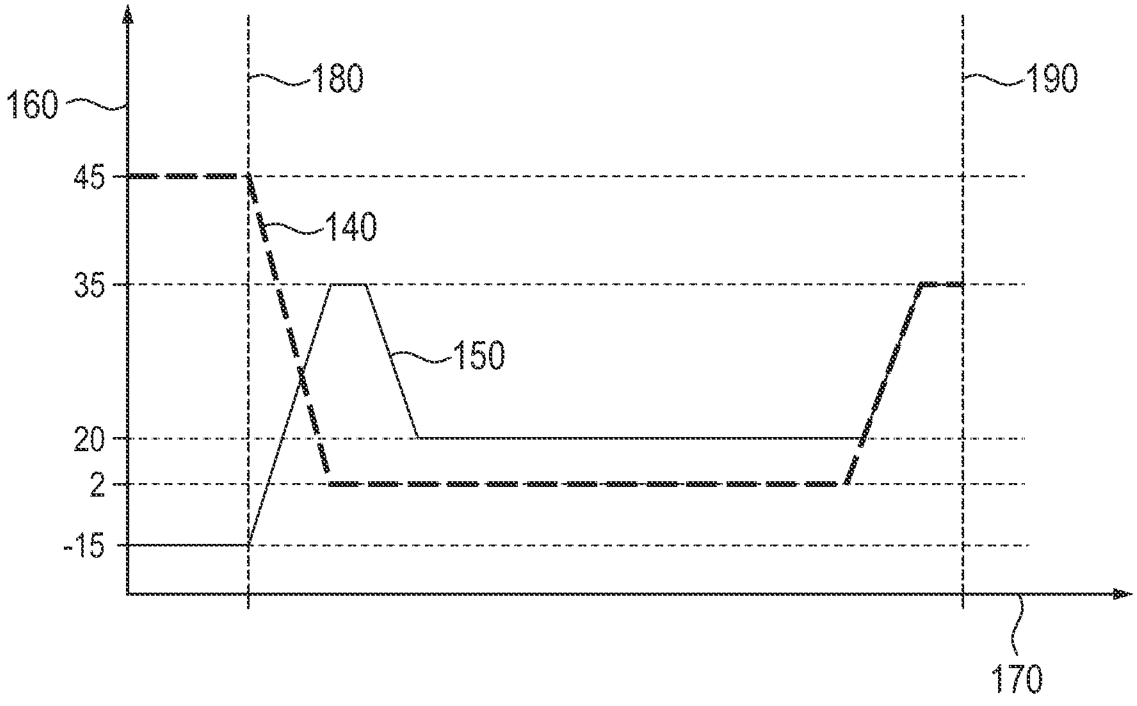
FIG. 3 shows exemplary curves of a first temperature during execution of a variant of the method.

FIG. 3 shows two exemplary curves of a supply temperature as first temperature 140, 150 during execution of a variant of the method. Temperatures in ° C. are indicated on the temperature axis.

Prior to execution of the method, the supply temperature corresponds to the outside air temperature. In the first case 140, this is 45° C., and in the second case 150 it is −15° C. At the start of the charging process 180 in the first case 140, the supply temperature is reduced directly. Since the temperatures in the charging device and the energy storage device are very high on account of the high outside air temperatures, it is not necessary to carry out heating of the energy storage device at the start of the charging process. Because of the very low probability of icing in and on the temperature control systems of the charging device and energy storage device, likewise on account of the high outside air temperatures, it is possible to set the supply temperature very low so that the heat produced during the charging process can be dissipated especially well. A little while before the end, for example about 5 minutes, the supply temperature is raised to 35° C. in order to bring the temperature of the energy storage device to an optimal temperature for subsequent driving of the vehicle.

At the start of the charging process 180 in the second case 150, the supply temperature is initially raised to 35° C. since the temperatures in the temperature control systems and in the energy storage device are very low on account of the low outside air temperatures, which involve the aforementioned disadvantages for the charging of the energy storage device. After the first temperature control phase, the temperature is ultimately set to a lower level of 20° C. This temperature still permits a dissipation of the heat produced during the charging process, but prevents icing inside and outside of the temperature control systems. As in the first case 140, a little while before the end of charging, for example about 4 minutes, a higher supply temperature of 35° C. is set here in order to bring the energy storage device to an optimal temperature for subsequent driving of the vehicle.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for controlling the charging process of an electrical energy storage device, at an electric charging device, wherein the charging device has a first temperature control system and the energy storage device has a second temperature control system, the method comprising:
transferring electrical energy between the charging device and the energy storage device;
transferring thermal energy between a cooling medium that loops through the first temperature control system of the charging device and a cooling medium that loops through the second temperature control system of the energy storage device;
obtaining charging progress information;
closed-loop or open-loop controlling of at least a first temperature of the cooling medium in the first temperature control system of the charging device and of the second temperature control system of the energy storage device as a function of the charging progress information,
wherein the first temperature control system of the charging device is different from the second temperature control system of the energy storage device,
wherein the second temperature control system is different from the first temperature control system such that the cooling medium looping through the second temperature control system remains separated from the cooling medium looping through the first temperature control system, and
wherein the first temperature is a supply temperature of the cooling medium of the first temperature control system of the charging device, and the first temperature is controlled to lower or increase by a coolant heat exchanger provided inside of the charging device, such that the charging device provides for heating and cooling of the energy storage device during the transfer of the electrical energy between the charging device and the energy storage device.

2. The method according to claim 1, wherein the first temperature is additionally controlled in a closed-loop or open-loop manner as a function of information on an outside air temperature.

3. The method according to claim 2, wherein the closed-loop or open-loop control of the first temperature is deactivated when the outside air temperature exceeds a specified temperature threshold.

4. The method according to claim 1, wherein the first temperature is lowered.

5. The method according to claim 1, wherein the first temperature is increased at a start of a charging process and/or is increased at an end of a charging process and/or is lowered between them.

6. The method according to claim 5, wherein the first temperature is increased by at least 5 K at a time.

7. The method according to claim 1, further comprising:
obtaining a temperature specification that was generated by a computing unit associated with the charging device; and
closed-loop or open-loop controlling of the first temperature furthermore dependent on the temperature specification.

8. A charging device for electrical energy storage devices, the charging device comprising:
a first interface for the transfer of electrical energy;
a second interface for the transfer of thermal energy;
a first temperature control system; and
a computing unit configured to carry out the method according to claim 1.

9. A system comprising:
an electric vehicle; and
the charging device according to claim 8,
wherein the electric vehicle comprises:
the energy storage device; and
a first interface for the transfer of electrical energy, which is connectable to the first interface of the charging device,
a second interface for the transfer of thermal energy, which is connectable to the second interface of the charging device, and
wherein the second interface of the electric vehicle is in operative thermal connection with the second temperature control system of the energy storage device, and the energy storage device is electrically charged via the first interface of the electric vehicle.

10. The method according to claim 1, wherein the charging progress information includes information as to how much time has passed since a start of a charging process of the energy storage device and how much time still remains until an end of the charging process.

11. The method according to claim 1, wherein the first temperature is increased at a start of a charging process, is increased at an end of a charging process and is lowered between the start of the charging process and the end of the charging process.

12. The method according to claim 1, wherein the energy storage device is provided inside of a vehicle and the electric charging device is provided external to the vehicle, wherein the first temperature control system of the charging device is provided inside of the charging device and the second temperature control system of the energy storage device is provided inside of the vehicle.

13. The method according to claim 12, wherein the transferring of thermal energy between the cooling medium of the first temperature control system of the charging device and the cooling medium of the second temperature control system of the energy storage device occurs by a thermal interface of the coolant heat exchanger provided inside of the charging device.

14. The method according to claim 1, wherein the cooling medium looping through the first temperature control system is a coolant and the cooling medium looping through the second temperature control system is a coolant, and wherein the transferring of thermal energy occurs by a transfer of thermal energy between the coolant of the first temperature control system and the coolant of the second temperature control system.

* * * * *